United States Patent
Öhmann et al.

(10) Patent No.: US 11,792,881 B2
(45) Date of Patent: Oct. 17, 2023

(54) FREQUENCY OFFSET DELTA TRACKING FOR NR CONNECTED MODE DISCONTINUOUS RECEPTION CARRIER AGGREGATION

(71) Applicant: APPLE INC., Cupertino, CA (US)

(72) Inventors: David Öhmann, Bavaria-Bayern (DE);
Hongbo Yan, San Diego, CA (US);
Amir Farajidana, Cupertino, CA (US);
Dietmar Gradl, Bavaria-Bayern (DE);
Sami M. Almalfouh, Cupertino, CA (US); Shengshan Cui, San Diego, CA (US)

(73) Assignee: APPLE INC., Cupertino, CA (US)

( * ) Notice: Subject to any disclaimer, the term of this patent is extended or adjusted under 35 U.S.C. 154(b) by 179 days.

(21) Appl. No.: 17/447,831

(22) Filed: Sep. 16, 2021

(65) Prior Publication Data
US 2023/0079512 A1   Mar. 16, 2023

(51) Int. Cl.
*H04W 76/28* (2018.01)
*H04L 5/00* (2006.01)
(Continued)

(52) U.S. Cl.
CPC .......... *H04W 76/28* (2018.02); *H04L 5/0048* (2013.01); *H04W 52/0235* (2013.01); *H04W 56/001* (2013.01); *H04W 72/0453* (2013.01)

(58) Field of Classification Search
CPC ..... H04W 76/00; H04W 76/20; H04W 76/28; H04W 56/00; H04W 56/001;
(Continued)

(56) References Cited

U.S. PATENT DOCUMENTS 6,370,188 B1 * 4/2002 Wu .................. H04L 27/2675
375/326
2005/0079845 A1 * 4/2005 Ansorge ............. H04L 27/0014
455/256
(Continued)

FOREIGN PATENT DOCUMENTS

CN   105871530   * 8/2016
CN   114615122   * 6/2022   ........... H04L 27/266

OTHER PUBLICATIONS

Ericsson, "NRS transmission on non-anchor carriers", R1-1701894, 3GPP TSG RAN#88, Athens, Greece, Agenda Item 7.2.4.4, Feb. 13-17, 2017, 6 pages.
(Continued)

*Primary Examiner* — Warner Wong
(74) *Attorney, Agent, or Firm* — Dorsey & Whitney LLP

(57) ABSTRACT

Systems and methods are provided for a user equipment (UE) to perform frequency offset (FO) delta tracking. For an anchor component carrier (CC), the UE wakes up to perform tracking updates on a plurality of successive DRX cycles. For the non-anchor CC, the UE determines a minimum update interval $\Delta t_{upd}$, and schedules wake-ups on a first subset of the plurality of successive DRX cycles based on the minimum update interval $\Delta t_{upd}$. For the first subset of the plurality of successive DRX cycles with scheduled wake-ups, the UE performs the tracking updates on the non-anchor CC and updates an FO delta between the anchor CC and the non-anchor CC. For a second subset of the plurality of successive DRX cycles without the scheduled wake-ups on the non-anchor CC, the UE applies the FO delta to correct for a frequency error.

20 Claims, 10 Drawing Sheets

(51) Int. Cl.
*H04W 52/02* (2009.01)
*H04W 56/00* (2009.01)
*H04W 72/0453* (2023.01)

(58) Field of Classification Search
CPC . H04W 52/00; H04W 52/02; H04W 52/0209; H04W 52/0225; H04W 72/00; H04W 72/04; H04W 72/044; H04W 72/0453; H04W 52/023; H04L 5/003; H04L 5/0048; H04L 5/005; H04L 5/0051; H04L 5/001; H04L 27/2659; H04L 27/266; H04L 2027/0026
See application file for complete search history.

(56) References Cited

U.S. PATENT DOCUMENTS

| | | | | |
|---|---|---|---|---|
| 2005/0089115 A1* | 4/2005 | Hartmann | ........ | H04L 27/22 375/285 |
| 2005/0213678 A1* | 9/2005 | Lewis | ........ | H04L 27/266 375/260 |
| 2007/0183518 A1* | 8/2007 | Ma | ........ | H04L 27/2662 375/260 |
| 2010/0118990 A1* | 5/2010 | Lee | ........ | H04L 27/2656 375/260 |
| 2010/0227569 A1* | 9/2010 | Bala | ........ | H04W 48/12 455/73 |
| 2013/0142178 A1* | 6/2013 | Kim | ........ | H04W 56/001 370/336 |
| 2013/0170590 A1* | 7/2013 | Hyll | ........ | H04L 25/0204 375/343 |
| 2016/0277256 A1 | 9/2016 | Mismar et al. | | |
| 2017/0311194 A1* | 10/2017 | Martin | ........ | H04W 24/10 |
| 2019/0173627 A1 | 6/2019 | Dinan | | |
| 2019/0215897 A1* | 7/2019 | Babaei | ........ | H04W 76/38 |
| 2023/0007587 A1* | 1/2023 | Ly | ........ | H04W 52/0206 |

OTHER PUBLICATIONS

Ericsson, St-Ericsson , "On Time and Frequency Synchronization on Additional Carrier Types", R1-112926, 3GPP TSG RAN WG1 Meeting #66bis, Zhuhai, China, Agenda Item 6.2.3, Oct. 10-14, 2011, 2 pages.

* cited by examiner

FREQUENCY OFFSET DELTA TRACKING FOR NR CONNECTED MODE DISCONTINUOUS RECEPTION CARRIER AGGREGATION

TECHNICAL FIELD

This application relates generally to wireless communication systems, including carrier aggregation in cellular systems.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

In wireless modem architectures with free-running oscillators (i.e., having an oscillator without temperature compensation), considerable frequency drifts may occur with temperature changes. For example, the frequency may drift a few parts per million (ppm) over a DRX cycle of 1.28 seconds (s). Such frequency drifts may be problematic since larger deviations between local (i.e., at the UE) and network (i.e., at the base station) reference frequencies should generally be avoided to ensure sufficient demodulation performance.

Some LTE systems use an always-on cell specific reference signal (CRS) (e.g., transmitted every 1 millisecond (ms)). In NR, however, certain reference signals may only be periodically transmitted. Embodiments disclosed herein are applicable to various different reference signals. Suitable reference signals for NR in Connected mode DRX, for example, include a tracking reference signal (TRS) and a synchronization signal block (SSB). For illustrative purposes, certain embodiments disclosed herein are described with respect to TRS. Persons skilled in the art will recognize from the disclosure herein, however, that such embodiments are not so limited and may be applicable to other types of reference signals, such as SSB. Further, certain embodiments may be applicable to a combination of SSB and TRS (e.g., using SSB on CC0 and TRS on CC1).

In NR, TRS may be transmitted with a certain periodicity (e.g., ≥10 ms). The periodicity of the TRS in NR can present challenges in certain situations. For example, during normal reception phases of NR, reference signals such as TRS are regularly received (e.g., every 10-20 ms) to correct frequency and timing errors, including errors caused by Doppler and oscillator drifts. In inactivity phases, e.g. NR connected mode discontinuous reception (C-DRx), it is likely that no reference signals are available during discontinuous reception (DRX) Active Time. Therefore, early wake-ups during non-Active Time are scheduled to perform tracking updates. It is useful to schedule as few additional wake-ups as possible to save power and as many wake-ups as necessary for ensuring adequate demodulation performance.

Figure 1:
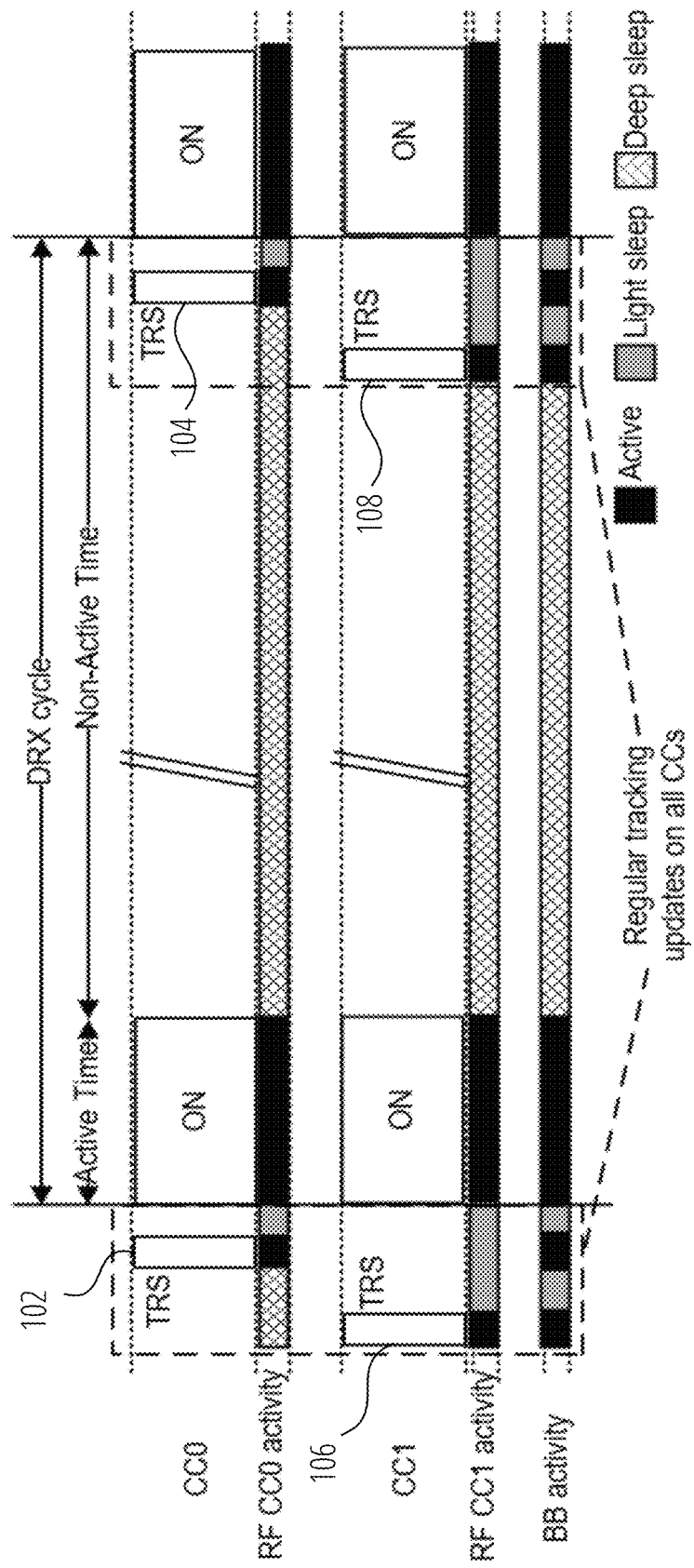
FIG. 1 illustrates early wake-ups on available component carriers before an Active Time in accordance with aspects of certain embodiments.

In case of NR carrier aggregation (CA) and C-DRx on active component carriers (CCs), a conventional solution is to wake up for TRS tracking updates on the CCs, i.e., early wake-ups are performed on all active CCs. For example, FIG. 1 illustrates early wake-ups on active CCs before an Active Time (shown as an "ON" state) during a DRX cycle to provide regular tracking updates on the CCs. As shown in the example of FIG. 1, the UE may wake up during the non-Active Time of the DRX cycle to measure TRS 102, TRS 104, TRS 106, and TRS 108 to determine frequency offsets on both a first CC (shown as CC0) and a second CC (shown as CC1). As a consequence, various radio frequency (RF) and baseband (BB) components of the UE are frequently active. See, e.g., RF CC0 activity, RF CC1 activity, and BB activity shown in FIG. 1 being either active or in light sleep modes during the non-Active Time (rather than in a deep sleep mode). Misaligned TRS can further reduce RF and/or BB sleep durations and UE power efficiency, since longer deep sleep durations are split into shorter light sleep durations, which increases power consumption.

Figure 2:
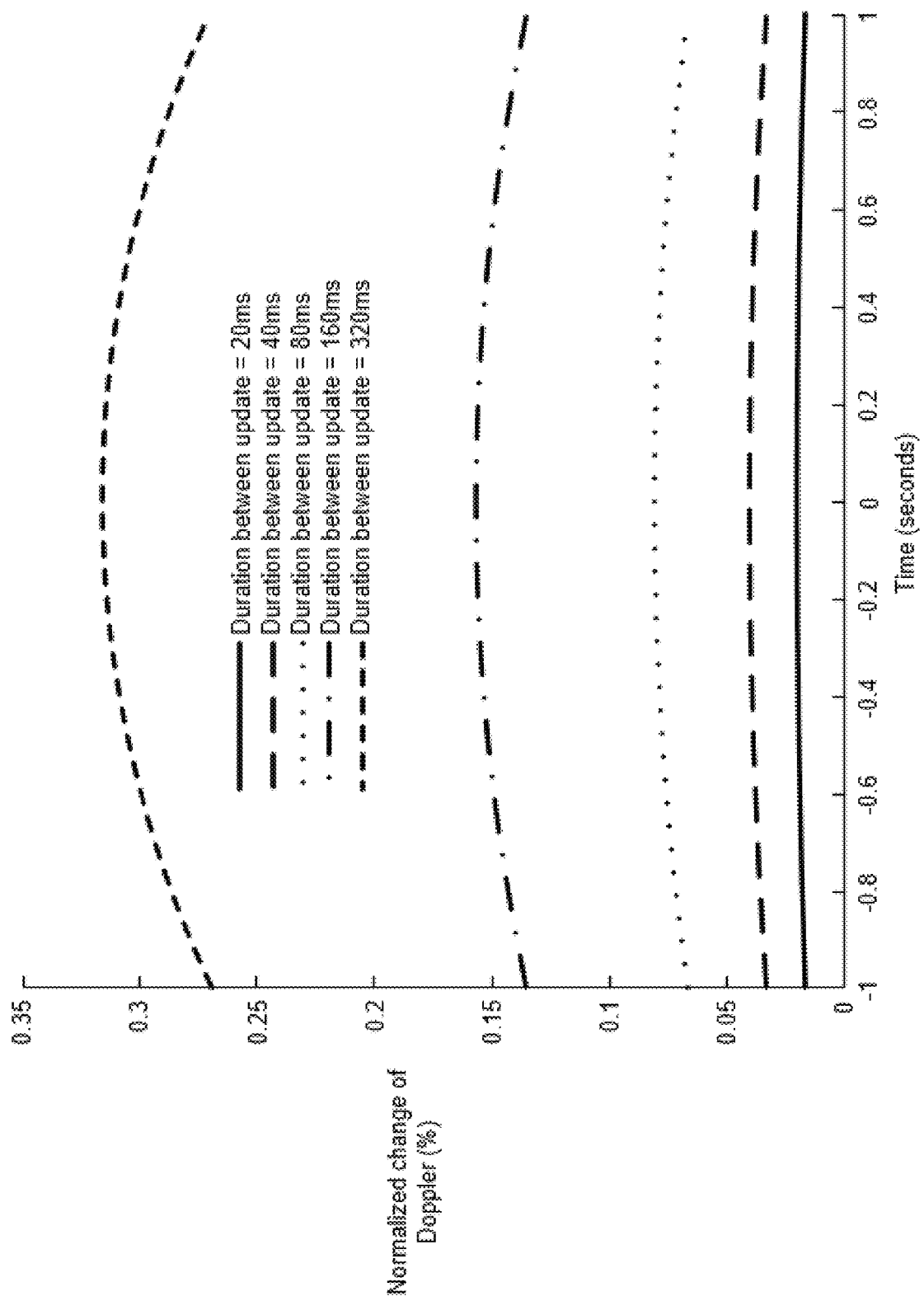
FIG. 2 illustrates normalized frequency changes due to Doppler over time for a UE passing a base station in accordance with aspects of certain embodiments.

Frequency error at a UE may be caused by, for example, UE oscillator frequency drift (which may be CC-independent), Doppler frequency shift (which may be velocity and CC-dependent), and base station oscillator frequency drift (which may be CC-dependent). Compared to UE oscillator frequency drift, base station oscillator frequency drift is typically small and slow. Further, Doppler frequency changes may also be slow compared to UE oscillator frequency drift. For example, FIG. 2 illustrates normalized frequency changes due to Doppler over time for a UE passing a base station (BS) at 120 kilometers per hour (km/h) at a carrier frequency of 4 gigahertz (GHz). As shown in this example, relative Doppler frequency change is smaller than 1% for a duration between updates of 320 ms. Thus, even in a scenario with a high UE velocity of 120 km/h, the Doppler statistics may only need to be updated approximately every 320 ms while the UE oscillator frequency drift may need to be tracked more frequently.

Based on the observation that CC-dependent frequency errors often require less frequency tracking updates than CC-independent UE oscillator frequency drift, certain embodiments disclosed herein only occasionally (not every C-DRx cycle) perform tracking updates on all CCs and determine a frequency offset (FO) delta between an anchor CC and a non-anchor CC to capture changes of CC-dependent components.

Figure 3:
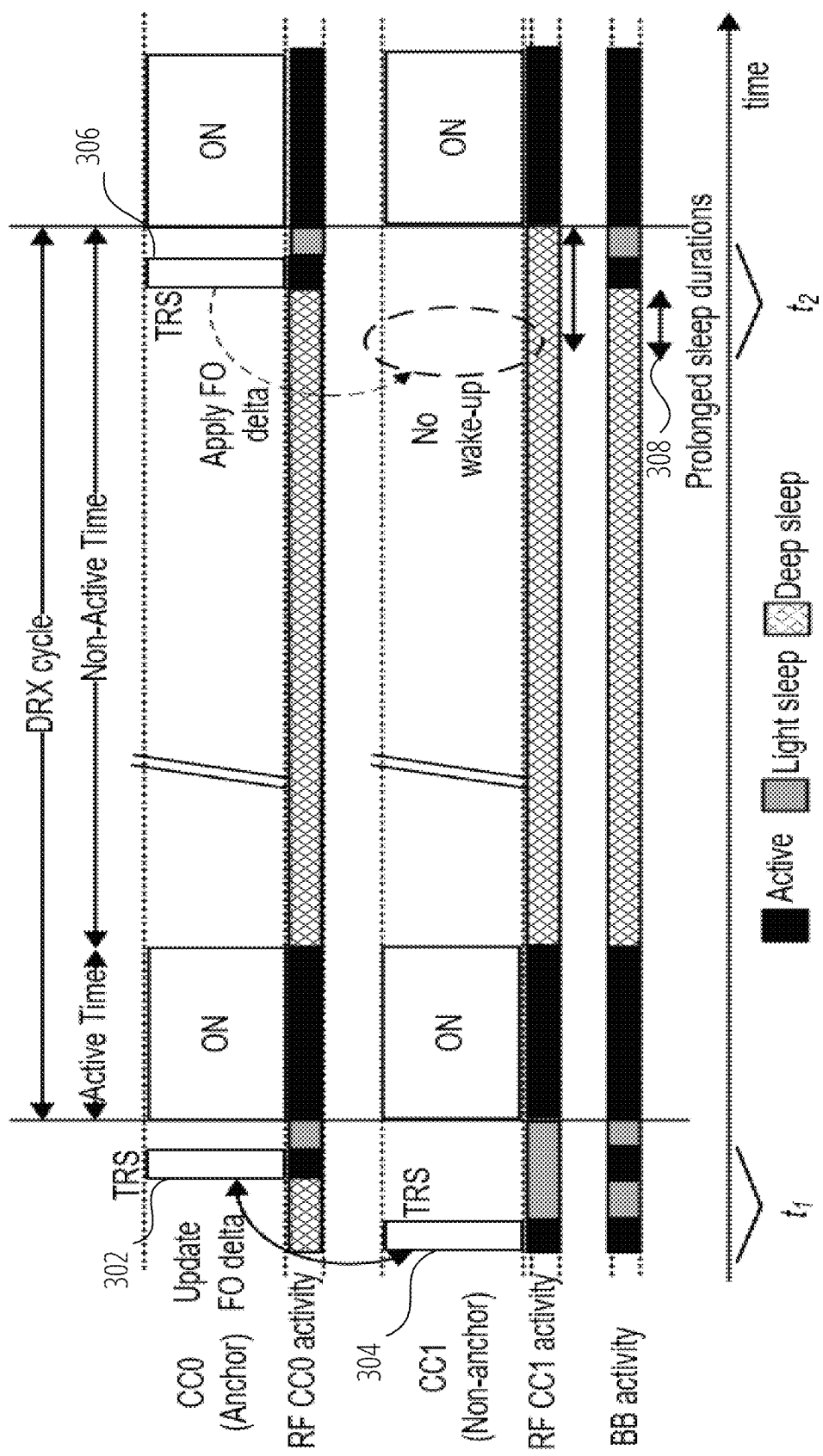
FIG. 3 illustrates updating a frequency offset delta between component carriers in a first DRX cycle and applying the frequency offset delta in a second DRX cycle in accordance with one embodiment.

For example, FIG. 3 illustrates updating an FO delta between CCs in a first DRX cycle and applying the FO delta in a second DRX cycle according to certain embodiments. In the example shown in FIG. 3, CC0 is an anchor CC and CC1 is a non-anchor CC. Skilled persons will recognize from the disclosure herein that the illustrated concepts may be applied to any number of additional non-anchor CCs. In a time period $t_1$, the UE measures, in an active state, a TRS 302 on CC0 and a TRS 304 on CC1. The UE determines a first FO for the CC0, which may be based on the UE's oscillator frequency error (common for all CCs), a base station's frequency error for CC0, and the Doppler frequency for CC0. Similarly, the UE determines a second FO for the CC1, which may be based on the UE's oscillator frequency error (common for all CCs), a base station's frequency error for CC1, and the Doppler frequency for CC1. Based on the first FO and the second FO, the UE determines an FO delta (i.e., difference) between the CC0 and the CC1. Thus, the FO delta captures the changes between the CC-dependent components.

During the non-Active Time of the DRX cycle in a time period $t_2$, the UE wakes up and measures a TRS 306 for the CC0. Based on a TRS reception, the UE then determines an updated first FO for the CC0 based on current channel conditions, velocity, and oscillator temperatures. However, rather than waking up to measure a TRS for CC1 during the time period $t_2$, the UE applies the FO delta determined during the time period $t_1$ to update the second FO for the CC1. Thus, rather than being in an active mode or a light sleep mode throughout the time period $t_2$ (as in the time period $t_1$), the UE experiences a prolonged sleep duration 308 that extends into the time period $t_2$.

Figure 4:
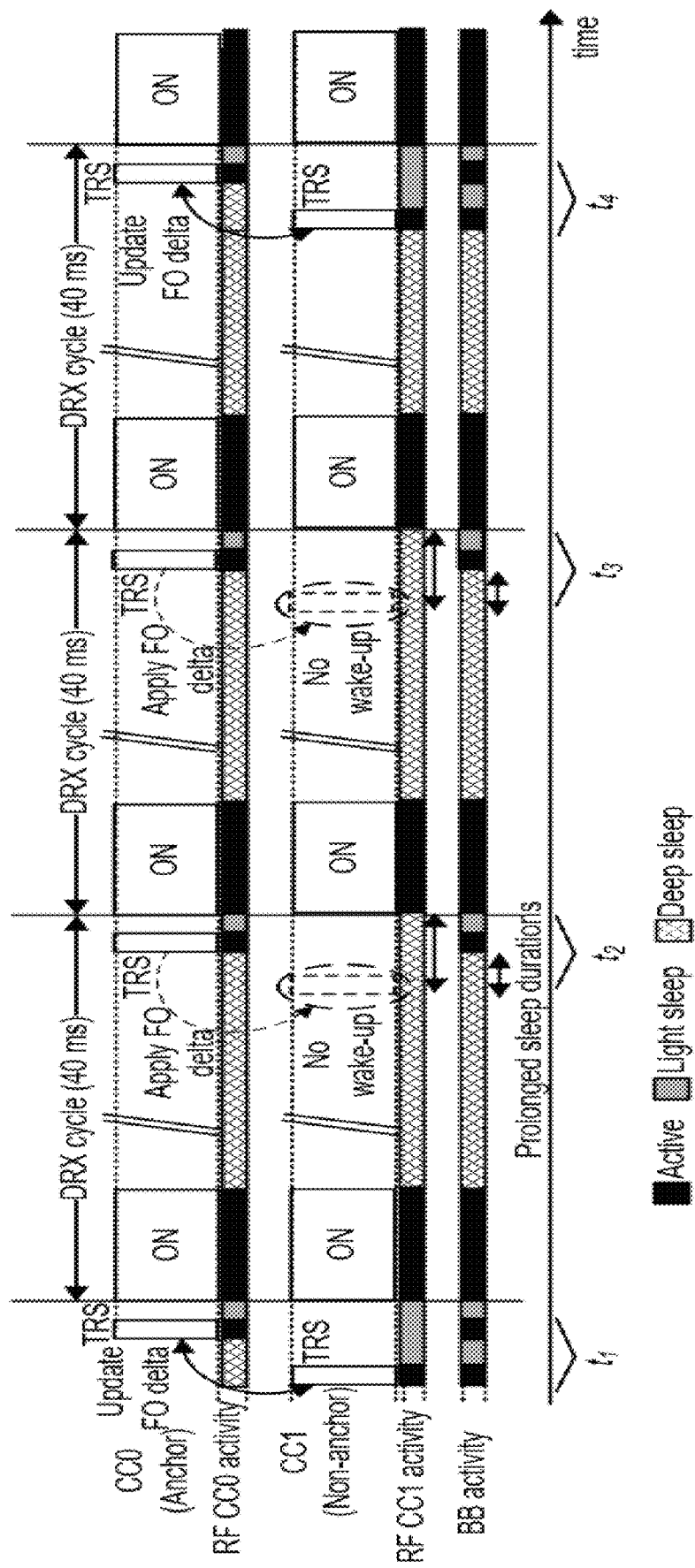
FIG. 4 illustrates an extension of the example shown in FIG. 3 across a plurality of DRX cycles in accordance with one embodiment.

For illustrative purposes, FIG. 4 extends the example shown in FIG. 3 across a plurality of DRX cycles according to certain embodiments. In the example shown in FIG. 4, the UE performs tracking updates on TRS signals and updates the FO delta between CC0 and CC1 (and any other non-anchor CCs) during time periods $t_1$ and $t_4$ to capture changes of CC-dependent components. During time periods $t_2$ and $t_3$ in the other DRX cycles, however, the UE obtains CC-independent information only on CC0 (the anchor CC) to reduce the number of wake-ups on the non-anchor CCs to a minimum. The tracking results of the anchor CC are used for the non-anchor CC(s) by applying the FO delta (e.g., with no wake-up to measure TRS for CC1 during time periods $t_2$ and $t_3$).

In FIG. 4, values such as the 40 ms DRX cycle are not limiting and are provided by way of example only. Further, while the example in FIG. 4 illustrates a pattern that assumes an overall update interval $\Delta t_{upd}$=140 ms (not shown) and performs an FO delta tracking update every third DRX cycle, skilled persons will recognize from the disclosure herein that the illustrated pattern is only an example and that other patterns are also possible. As discussed below, the overall update interval $\Delta t_{upd}$ is determined by taking a minimum of other parameter update intervals such as a power delay profile (PDP) update interval, an FO update interval, a Doppler shift update interval, and timing offset (TO) update interval.

Since the UE oscillator frequency drift is CC-independent, it is possible to track it only on the anchor CC. The update rate of the FO delta between the anchor CC and non-anchor CC(s) may depend on how long Doppler and base station oscillator frequency drift remain approximately constant. As discussed above with respect to FIG. 2, simulation results show that even at high UE velocities (120 km/h), the Doppler remains approximately constant for 320 ms. In case of a C-DRx cycle of 40 ms as shown in the example of FIG. 4, this means that an FO delta update may be needed only every 8th C-DRx cycle (i.e., waking up to measure TRS may be skipped on the non-anchor CCs for seven DRX cycles). Thus, the number of wake-ups on non-anchor CCs is considerably reduced. If the update interval of FO delta is properly chosen, there may be no or only minor performance impact. Further, significant power savings are possible. For example, in case of inter-bands CA with four CCs, power savings up to 75% can be achieved (i.e., approximately only one active RF component instead of four active per DRX cycle).

In certain embodiments, FO delta tracking may be described mathematically. For example, the frequency offset components at $t_1$ include:

$$AFC_{CC0}(t_1) = -RFO_{UE}(t_1) + F_{CC0,BS}(t_1) + F_{CC0,Doppler}(t_1); \text{ and}$$

$$AFC_{CC1}(t_1) = -RFO_{UE}(t_1) + F_{CC1,BS}(t_1) + F_{CC1,Doppler}(t_1),$$

where $RFO_{UE}(t_1)$ is the Reference Frequency Offset of the UE's reference oscillator and represents the UE oscillator frequency error (common for all CCs), $AFC_{CC0}$ is the Automatic Frequency Correction applied at the UE for CC0, $AFC_{CC1}$ is the Automatic Frequency Correction applied at the UE for CC1, $F_{CC0,BS}$ is the frequency offset of the base station for CC0, $F_{CC1,BS}$ is the frequency offset of the base station for CC1, $F_{CC0,Doppler}$ is the Doppler frequency for CC0, and $F_{CC1,Doppler}$ is the Doppler frequency for CC1.

The AFC delta between CC0 and CC1 at $t_1$ is $\Delta AFC_{CC0,CC1}(t_1) = AFC_{CC0}(t_1) - AFC_{CC1}(t_1)$. Assuming that Doppler shifts and BS FOs remain approximately constant from $t_1$ to $t_2$, $\Delta AFC_{CC0,CC1}(t_2) \approx \Delta AFC_{CC0,CC1}(t_1)$. The CC1 frequency offset can be tracked based on AFC of CC0 as follows:

$$AFC_{CC1}(t_2) = AFC_{CC0}(t_2) - \Delta AFC_{CC0,CC1}(t_2) \approx AFC_{CC0}(t_2) - \Delta AFC_{CC0,CC1}(t_1).$$

As a result, TRS wake-up at $t_2$ can be skipped for CC1. See, e.g., FIG. 3.

The usage of certain embodiments disclosed herein may be detected, for example, by monitoring whether and how the RF and/or BB activities and power consumption change when switching from single CC to CA. In a first variant, an identical C-DRx configuration may be used for all CCs (e.g., same TRS positions and periodicities). If an embodiment described herein is used, only a single CC (e.g., anchor CC) shows regular activities during C-DRx non-Active Time, while other CCs show a different behavior (i.e., less active), even though they are configured in the same way as the more active anchor CC.

In a second variant, embodiments disclosed herein may be detected by configuring different TRS positions and periodicities for different CCs and observing when the UE wakes up for TRS receptions. For example, CC0 may be configured with TRS shortly before an ON duration and CC1 may be configured with TRS 40 ms before an ON duration. Then, whether and how often UE wakes up for the TRS located 40 ms before the ON duration may be monitored. If the UE does not wake up every C-DRx cycle for the TRS located 40 ms before the ON duration, it is an indication that a disclosed embodiment is used.

Figure 5:
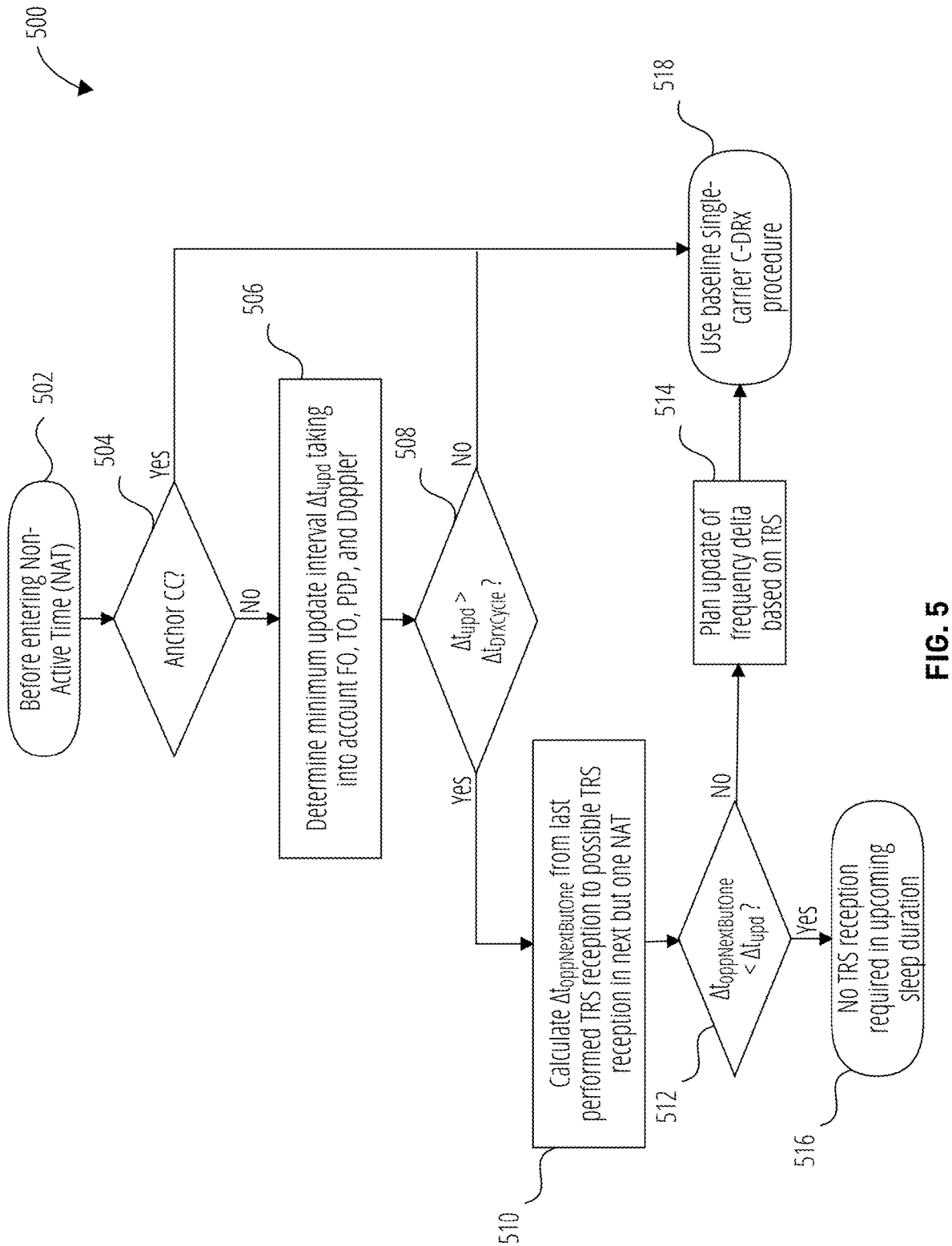
FIG. 5 is a flowchart of a method for a UE to schedule wake-ups on a specific component carrier for frequency offset delta tracking in accordance with one embodiment.

FIG. 5 is a flowchart of a method 500 for a UE to schedule wake-ups on a specific CC for FO delta tracking according to one embodiment. The method may be used to ensure that only a last possible TRS before an Active Time is used (i.e., no wake-ups in the beginning or middle of a non-Active Time).

The method 500 begins, in block 502, before entering a non-Active Time (NAT) (e.g., light sleep or deep sleep). In decision block 504, the method 500 includes determining whether the CC is an anchor CC. If the CC is an anchor CC, at block 518, the method 500 includes using a baseline single-carrier C-DRx procedure, such as that shown in FIG. 1. If the CC is not an anchor CC, in block 506, the method 500 includes determining a minimum update interval $\Delta t_{upd}$ taking into account FO, TO, PDP, and Doppler. An example of determining the minimum update interval $\Delta t_{upd}$ is discussed below with respect to FIG. 7.

In decision block 508, the method 500 includes comparing the minimum update interval $\Delta t_{upd}$ to a DRX cycle duration $\Delta t_{DrxCycle}$. If the minimum update interval $\Delta t_{upd}$ is less than the DRX cycle duration $\Delta t_{DrxCycle}$, at block 518, the method 500 includes using the baseline single-carrier C-DRx procedure, such as that shown in FIG. 1. If $\Delta t_{upd} > \Delta t_{DrxCycle}$, then in block 510 the method 500 includes calculating a time duration $\Delta t_{oppNextButOne}$ from a last performed TRS reception to a possible TRS reception in the next but one NAT (i.e., the NAT after the next NAT). As discussed below with respect to FIG. 6, for example, during an Active time or first ON duration 602 before entering a NAT in a first DRX cycle 604, the UE determines a first time duration $\Delta t_{oppNextButOne}$ in CC1 corresponding to the time (80 ms) between receiving a last TRS 606 and a possible TRS reception 608 in a second DRX cycle 610, where a first deep sleep mode after the first ON duration 602 in the first DRX cycle 604 is the next NAT and a second deep sleep mode after a second ON duration 612 in the second DRX cycle 610 is the next but one NAT.

In decision block 512, the method 500 includes comparing the time duration $\Delta t_{oppNextButOne}$ to the minimum update interval $\Delta t_{upd}$. If the $\Delta t_{oppNextButOne}$ is greater than the minimum update interval $\Delta t_{upd}$, then in block 514 the method 500 includes planning or scheduling an update of the frequency delta based on a TRS in the upcoming NAT. The method 500 then proceeds to the block 518 to use the baseline single-carrier C-DRx procedure. If, however, $\Delta t_{oppNextButOne} < \Delta t_{upd}$, in block 516 the UE determines that no TRS reception is required in the upcoming sleep duration. The method 500 may then return to block 502 for the next NAT.

Embodiments contemplated herein include an apparatus comprising means to perform one or more elements of the method 500. This apparatus may be, for example, an apparatus of a UE (such as a wireless device 1002 that is a UE, as described herein).

Embodiments contemplated herein include one or more non-transitory computer-readable media comprising instructions to cause an electronic device, upon execution of the instructions by one or more processors of the electronic device, to perform one or more elements of the method 500. This non-transitory computer-readable media may be, for example, a memory of a UE (such as a memory 1006 of a wireless device 1002 that is a UE, as described herein).

Embodiments contemplated herein include an apparatus comprising logic, modules, or circuitry to perform one or more elements of the method 500. This apparatus may be, for example, an apparatus of a UE (such as a wireless device 1002 that is a UE, as described herein).

Embodiments contemplated herein include an apparatus comprising: one or more processors and one or more computer-readable media comprising instructions that, when executed by the one or more processors, cause the one or more processors to perform one or more elements of the method 500. This apparatus may be, for example, an apparatus of a UE (such as a wireless device 1002 that is a UE, as described herein).

Embodiments contemplated herein include a signal as described in or related to one or more elements of the method 500.

Embodiments contemplated herein include a computer program or computer program product comprising instructions, wherein execution of the program by a processor is to cause the processor to carry out one or more elements of the method 500. The processor may be a processor of a UE (such as a processor(s) 1004 of a wireless device 1002 that is a UE, as described herein). These instructions may be, for example, located in the processor and/or on a memory of the UE (such as a memory 1006 of a wireless device 1002 that is a UE, as described herein).

Figure 6:
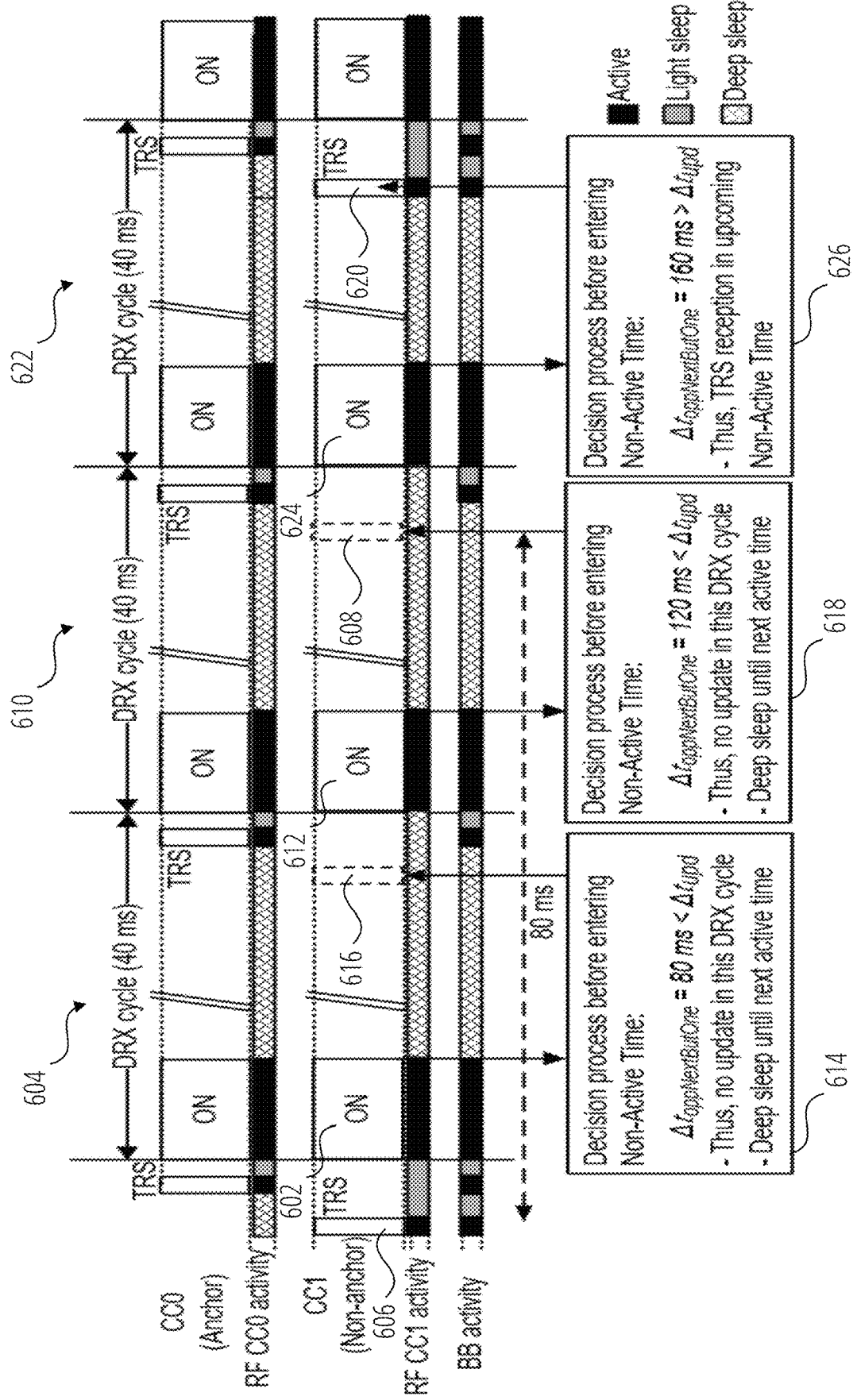
FIG. 6 illustrates an example of a UE scheduling wake-ups for frequency offset delta tracking in accordance with one embodiment.

FIG. 6 illustrates an example of a UE scheduling wake-ups for FO delta tracking according to one embodiment. In this example, the UE may use the method 500 shown in FIG. 5. The example shown in FIG. 6 is for two CCs and a DRX cycle duration of 40 ms, and it is assumed that CC1's minimum update interval $\Delta t_{upd}$ remains substantially constant at 140 ms. It may be noted that, in theory, an update may be required after 3.5 DRX cycles. However, since it is desired to use the last TRS occasion before an Active Time, the update in this example occurs every third DRX cycle.

In the example shown in FIG. 6, during an Active time or first ON duration 602 before entering a NAT in a first DRX cycle 604, the UE performs a first decision process 614. As discussed above, the UE determines the first time duration $\Delta t_{oppNextButOne}$ in CC1 corresponding to the time (80 ms) between receiving the last TRS 606 and a possible TRS reception 608 in a second DRX cycle 610. The UE then determines that $\Delta t_{oppNextButOne}$=80 ms<$\Delta t_{upd}$. Thus, the UE does not update the FO delta in the first DRX cycle 604 or wake up for a possible TRS reception 616. Rather, the UE remains in a deep sleep on CC1 until the next Active Time or second ON duration 612 in the second DRX cycle 610.

During the second ON duration 612 before entering a NAT in the second DRX cycle 610, the UE performs a second decision process 618. The UE determines a second time duration $\Delta t_{oppNextButOne}$ in CC1 corresponding to a time (120 ms) between receiving the last TRS 606 and possibly receiving a TRS 620 in a third DRX cycle 622. The UE then determines that $\Delta t_{oppNextButOne}$=120 ms<$\Delta t_{upd}$. Thus, the UE does not update the FO delta in the second DRX cycle 610 or wake up for the possible TRS reception 608. Rather, the UE remains in a deep sleep on CC1 until the next Active Time or third ON duration 624 in the third DRX cycle 622. During the third ON duration 624 before entering a NAT in the third DRX cycle 622, the UE performs a third decision process 626. The UE determines a third time duration $\Delta t_{oppNextButOne}$ in CC1 corresponding to a time (160 ms) between receiving the last TRS 606 and a possible TRS reception (not shown) in a next but one NAT. The UE then determines that $\Delta t_{oppNextButOne}$=160 ms>$\Delta t_{upd}$. Thus, the UE schedules reception of the TRS 620 in the upcoming non-Active Time of the third DRX cycle 622. As discussed above, the UE can then update the FO delta.

Accordingly, by reducing the number of wake-ups on CC1, the UE's power consumption may be considerably reduced.

In addition to receiving TRS to correct frequency errors, or in other embodiments, the disclosed solutions herein may be applied to timing errors (i.e., TO delta tracking). Further, embodiments disclosed herein may be applied to Idle mode scenarios, where only SSB is available for FO and/or TO updates. As discussed above, embodiments disclosed herein may also be applied in combination with SSB receptions in Connected mode DRX.

Figure 7:
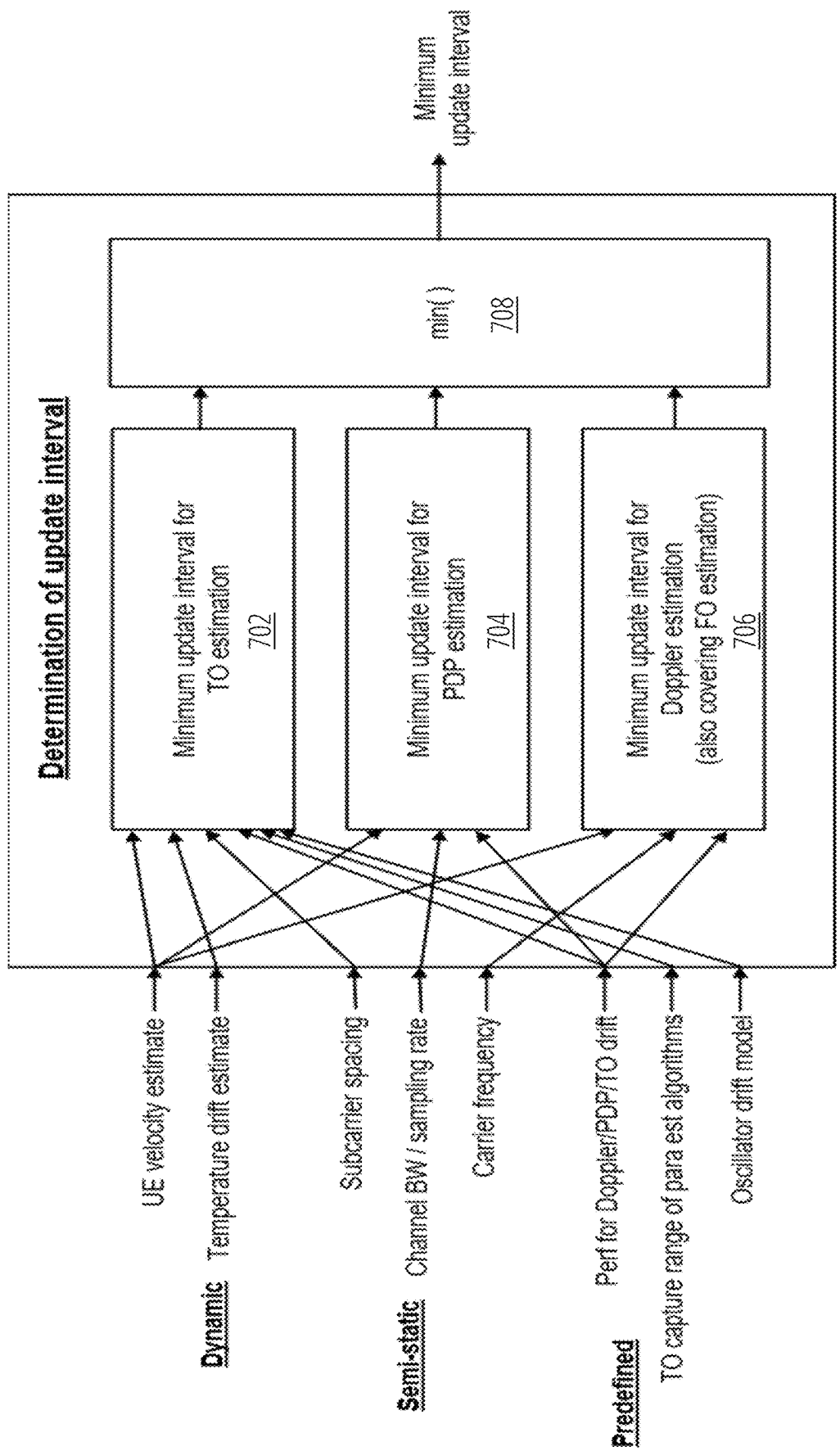
FIG. 7 is a block diagram illustrating determination of a minimum update interval $\Delta t_{upd}$ in accordance with one embodiment.

FIG. 7 is a block diagram illustrating determination of a minimum update interval $\Delta t_{upd}$ according to one embodiment. In this example, dynamic parameters, semi-static parameters, and predefined parameters are provided to a process 702 to determine a minimum update interval for TO estimation, a process 704 to determine a minimum update interval for PDP estimation, and a process 706 to determine a minimum update interval for Doppler estimation (also covering FO estimation). The dynamic parameters include a UE velocity estimate and a temperature drift estimate. The semi-static parameters include a subcarrier spacing (SCS), a channel bandwidth (BW) and/or sampling rate, and a carrier frequency. The predefined parameters include a demodulation performance (Perf) with respect to Doppler/PDP/TO drift, a TO capture range of parameter estimation algorithms, and an oscillator drift model.

In FO delta tracking, as discussed herein, certain TRS receptions are skipped on non-anchor CCs when CC-dependent FO components remain approximately constant between two FO delta tracking updates and when errors of other parameter estimates (e.g., TO, PDP, and Doppler shift) remain within specified limits. Occasionally, TRS are received for updating the FO deltas and other parameter estimates.

A minimum function 708 is used to determine the overall update interval $\Delta t_{upd}$ by taking a minimum of the other parameter update intervals. In other words, the minimum update interval is given by $\Delta t_{upd}=\min(\Delta t_{upd,FO}, \Delta t_{upd,TO}, \Delta t_{upd,PDP}, \Delta t_{upd,Doppler})$, where $\Delta t_{upd,FO}$ is the minimum FO update interval, $\Delta t_{upd,TO}$ is the minimum TO update interval, $\Delta t_{upd,PDP}$ is the minimum PDP update interval for sufficient demodulation performance, and $\Delta t_{upd,Doppler}$ is the minimum Doppler shift update interval.

The minimum PDP update interval $\Delta t_{upd,PDP}$ may be based on a basic performance requirement that a maximum PDP shift is smaller than one sample. For a UE velocity v and a sampling rate S, $\Delta t_{upd,PDP} \leq (1/S \times c/v)$, where c is the speed of light. For example, when v=120 km/h and S=61.44 MHz (BW 50 MHz), $\Delta t_{upd,PDP} \leq (1/S \times c/v) \approx 146$ ms.

The minimum FO update interval $\Delta t_{upd,FO}$ may depend on Doppler shift (CC-dependent), UE oscillator frequency drift (CC-independent), and BS oscillator frequency drift (CC-dependent). In certain embodiments, the UE oscillator frequency drift may be sufficiently compensated for by the anchor CC, and therefore may not be relevant to the calculation of the minimum FO update interval $\Delta t_{upd,FO}$. In certain embodiments, the BS oscillator frequency drift is typically small and slow, and therefore may be neglected in the calculation of the minimum FO update interval $\Delta t_{upd,FO}$. In certain embodiments, the Doppler shift may be treated as a separate parameter estimate (see below), e.g., $\Delta t_{upd,FO} \approx \Delta t_{upd,Doppler}$.

The minimum Doppler shift update interval $\Delta t_{upd,Doppler}$ is based on the Doppler shift change remaining sufficiently small (e.g., relative change smaller than a threshold). In certain embodiments, it may be difficult to analytically describe the Doppler change. Thus, as described with respect to FIG. 2, simulations may be used to determine expected Doppler shift changes and resulting update intervals for different UE velocities and carrier frequencies. In certain embodiments, a look-up table may be used with UE velocity and carrier frequency to determine the minimum update interval. The UE velocity estimate may be determined, e.g., based on channel characteristics. By way of example (see FIG. 2), for UE velocity v=120 km/h and carrier frequency f=4 GHz, relative Doppler change is smaller than 1% for 320 ms. Thus, $\Delta t_{upd,Doppler}$=320 ms is sufficient.

The minimum TO update interval $\Delta t_{upd,TO}$ may be based on synchronization and demodulation performance. For synchronization, the TO is selected to be smaller than a TO capture range of TRS. For the demodulation performance, a maximum allowed TO and resulting update interval is determined by performance simulations. The minimum TO update interval $\Delta t_{upd,TO}$ may be based on UE velocity, temperature gradient, oscillator drift model, subcarrier spacing, TRS TO capture ranges, and demodulation performance requirement with respect to TO drift.

In certain embodiments for modeling TO drift, errors may be considered such as timing drift of the oscillator and propagation delay change because of UE mobility.

Figure 8:
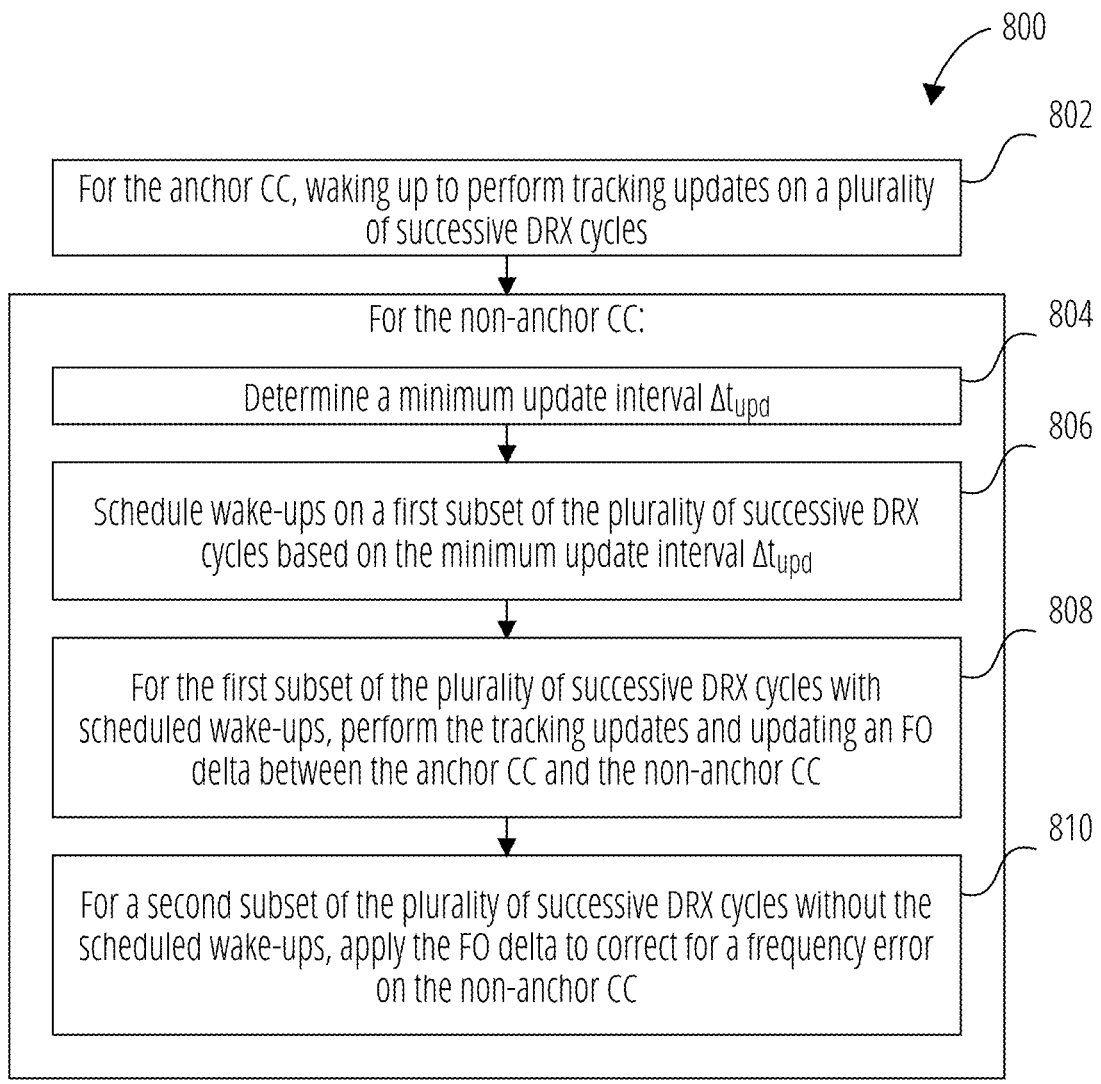
FIG. 8 is a flowchart of a method for a UE to perform frequency offset delta tracking between an anchor component carrier and a non-anchor component carrier in accordance with one embodiment.

FIG. 8 is a flowchart of a method 800 for a UE to perform FO delta tracking between an anchor CC and a non-anchor CC for DRX CA according to one embodiment. In block 802, for the anchor CC, the method 800 includes waking up to perform tracking updates on a plurality of successive DRX cycles.

For the non-anchor CC, the method 800 includes: determining (block 804) a minimum update interval $\Delta t_{upd}$; scheduling (in block 806) wake-ups on a first subset of the plurality of successive DRX cycles based on the minimum update interval $\Delta t_{upd}$; for the first subset of the plurality of successive DRX cycles with scheduled wake-ups, performing (in block 808) the tracking updates and updating an FO delta between the anchor CC and the non-anchor CC; and for a second subset of the plurality of successive DRX cycles without the scheduled wake-ups, applying (in block 810) the FO delta to correct for a frequency error on the non-anchor CC.

In certain embodiments of the method 800, waking up to perform tracking updates on the anchor CC comprises: receiving a tracking reference signal (TRS) or a synchronization signal block (SSB) on the anchor CC; and determining FO information on the anchor CC based at least in part on the TRS or the SSB. The FO information may include, for example, CC-independent information and/or CC-dependent information. Applying the FO delta may include using the FO information determined for the anchor CC on the non-anchor CC.

In certain embodiments of the method 800, scheduling the wake-ups for the non-anchor CC comprises, before entering a non-Active Time (NAT): determining the minimum update interval $\Delta t_{upd}$ based on one or more of a minimum FO update interval $\Delta t_{upd,FO}$, a minimum timing offset (TO) update interval $\Delta t_{upd,TO}$, a minimum power delay profile (PDP) update interval $\Delta t_{upd,PDP}$, and a minimum Doppler shift update interval $\Delta t_{upd,Doppler}$; in response to the minimum update interval $\Delta t_{upd}$ being greater than a DRX cycle duration $\Delta t_{DrxCycle}$, calculating a time duration $\Delta t_{oppNextButOne}$ from a last performed tracking reference signal (TRS) reception to a possible TRS reception in a next but one NAT; when the $\Delta t_{oppNextButOne}$ is greater than the minimum update interval $\Delta t_{upd}$, scheduling an update of the FO delta based on a TRS in the NAT; and when the $\Delta t_{oppNextButOne}$ is less than the minimum update interval $\Delta t_{upd}$, skipping reception of the TRS in the NAT.

In certain embodiments of the method 800, $\Delta t_{upd}$=min$(\Delta t_{upd,FO}, \Delta t_{upd,TO}, \Delta t_{upd,PDP}, \Delta t_{upd,Doppler})$.

In certain embodiments of the method 800, the minimum PDP update interval $\Delta t_{upd,PDP} \leq (1/S \times c/v)$, where v is a UE velocity, S is a sampling rate, and c is the speed of light.

In certain embodiments of the method 800, the minimum FO update interval $\Delta t_{upd,FO}$ depends on one or more of a Doppler shift, a UE oscillator frequency drift, and a base station oscillator frequency drift.

In certain embodiments of the method 800, the minimum Doppler shift update interval $\Delta t_{upd,Doppler}$ is based on simulations to determine expected Doppler shift changes and resulting update intervals for different UE velocities and carrier frequencies.

In certain embodiments of the method 800, the minimum TO update interval $\Delta t_{upd,TO}$ is based one or more of a UE velocity, a temperature gradient, an oscillator drift model, a subcarrier spacing, a TRS TO capture range, and a demodulation performance requirement with respect to TO drift.

Embodiments contemplated herein include an apparatus comprising means to perform one or more elements of the method 800. This apparatus may be, for example, an apparatus of a UE (such as a wireless device 1002 that is a UE, as described herein).

Embodiments contemplated herein include one or more non-transitory computer-readable media comprising instructions to cause an electronic device, upon execution of the instructions by one or more processors of the electronic device, to perform one or more elements of the method 800. This non-transitory computer-readable media may be, for example, a memory of a UE (such as a memory 1006 of a wireless device 1002 that is a UE, as described herein).

Embodiments contemplated herein include an apparatus comprising logic, modules, or circuitry to perform one or more elements of the method 800. This apparatus may be, for example, an apparatus of a UE (such as a wireless device 1002 that is a UE, as described herein).

Embodiments contemplated herein include an apparatus comprising: one or more processors and one or more computer-readable media comprising instructions that, when executed by the one or more processors, cause the one or more processors to perform one or more elements of the method 800. This apparatus may be, for example, an apparatus of a UE (such as a wireless device 1002 that is a UE, as described herein).

Embodiments contemplated herein include a signal as described in or related to one or more elements of the method 800.

Embodiments contemplated herein include a computer program or computer program product comprising instructions, wherein execution of the program by a processor is to cause the processor to carry out one or more elements of the method 800. The processor may be a processor of a UE (such as a processor(s) 1004 of a wireless device 1002 that is a UE, as described herein). These instructions may be, for example, located in the processor and/or on a memory of the UE (such as a memory 1006 of a wireless device 1002 that is a UE, as described herein).

Figure 9:
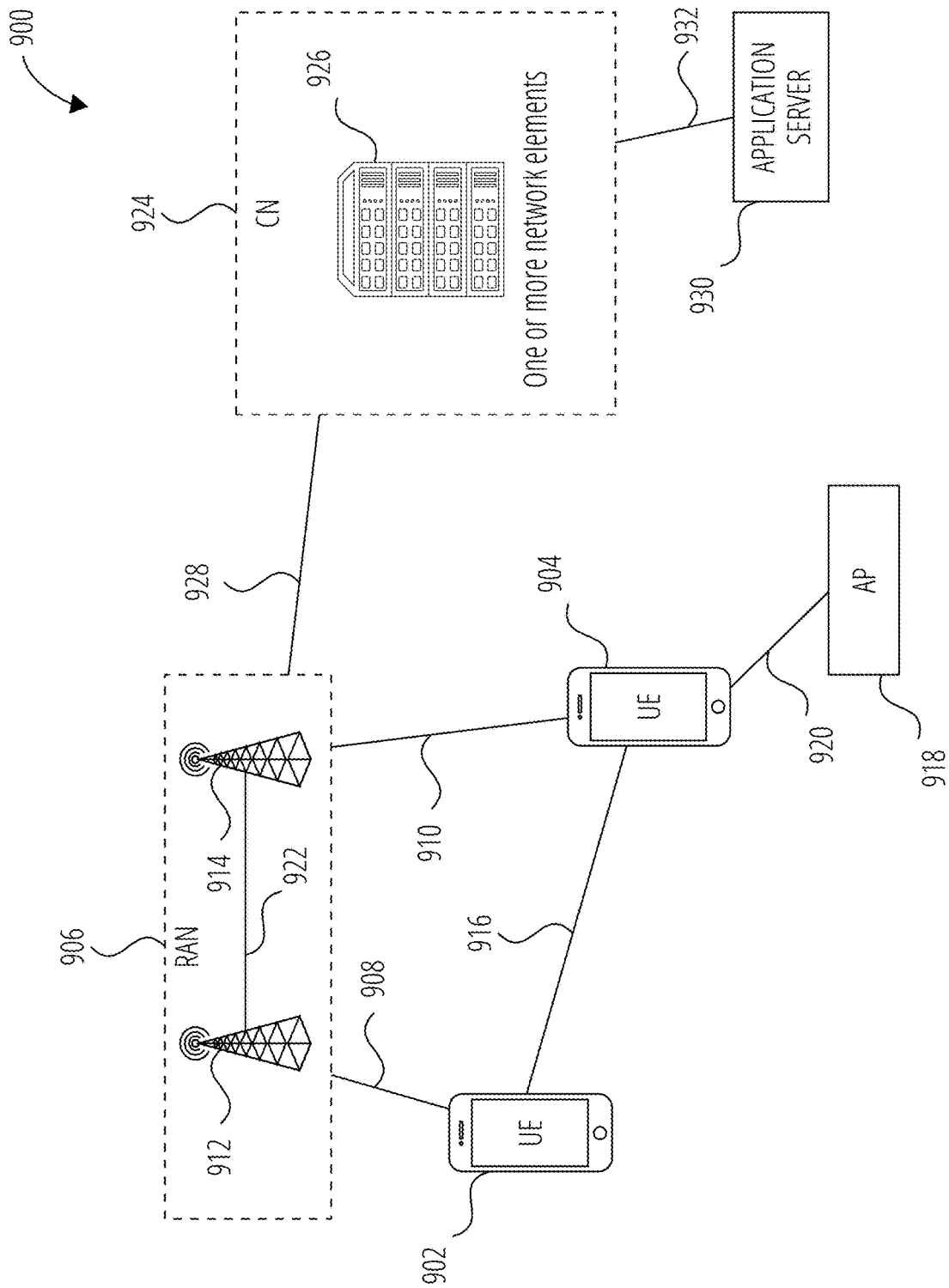
FIG. 9 illustrates an example architecture of a wireless communication system, according to embodiments disclosed herein.

FIG. 9 illustrates an example architecture of a wireless communication system 900, according to embodiments disclosed herein. The following description is provided for an example wireless communication system 900 that operates in conjunction with the LTE system standards and/or 5G or NR system standards as provided by 3GPP technical specifications.

As shown by FIG. 9, the wireless communication system 900 includes UE 902 and UE 904 (although any number of UEs may be used). In this example, the UE 902 and the UE 904 are illustrated as smartphones (e.g., handheld touchscreen mobile computing devices connectable to one or more cellular networks), but may also comprise any mobile or non-mobile computing device configured for wireless communication.

The UE 902 and UE 904 may be configured to communicatively couple with a RAN 906. In embodiments, the RAN 906 may be NG-RAN, E-UTRAN, etc. The UE 902 and UE 904 utilize connections (or channels) (shown as connection 908 and connection 910, respectively) with the RAN 906, each of which comprises a physical communications interface. The RAN 906 can include one or more base stations, such as base station 912 and base station 914, that enable the connection 908 and connection 910.

In this example, the connection 908 and connection 910 are air interfaces to enable such communicative coupling, and may be consistent with RAT(s) used by the RAN 906, such as, for example, an LTE and/or NR.

In some embodiments, the UE 902 and UE 904 may also directly exchange communication data via a sidelink interface 916. The UE 904 is shown to be configured to access an access point (shown as AP 918) via connection 920. By way of example, the connection 920 can comprise a local wireless connection, such as a connection consistent with any IEEE 902.11 protocol, wherein the AP 918 may comprise a Wi-Fi® router. In this example, the AP 918 may be connected to another network (for example, the Internet) without going through a CN 924.

In embodiments, the UE 902 and UE 904 can be configured to communicate using orthogonal frequency division multiplexing (OFDM) communication signals with each other or with the base station 912 and/or the base station 914 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 912 or base station 914 may be implemented as one or more software entities running on server computers as part of a virtual network. In addition, or in other embodiments, the base station 912 or base station 914 may be configured to communicate with one another via interface 922. In embodiments where the wireless communication system 900 is an LTE system (e.g., when the CN 924 is an EPC), the interface 922 may be an X2 interface. The X2 interface may be defined between two or more base stations (e.g., two or more eNBs and the like) that connect to an EPC, and/or between two eNBs connecting to the EPC. In embodiments where the wireless communication system 900 is an NR system (e.g., when CN 924 is a 5GC), the interface 922 may be an Xn interface. The Xn interface is defined between two or more base stations (e.g., two or more gNBs and the like) that connect to 5GC, between a base station 912 (e.g., a gNB) connecting to 5GC and an eNB, and/or between two eNBs connecting to 5GC (e.g., CN 924).

The RAN 906 is shown to be communicatively coupled to the CN 924. The CN 924 may comprise one or more network elements 926, which are configured to offer various data and telecommunications services to customers/subscribers (e.g., users of UE 902 and UE 904) who are connected to the CN 924 via the RAN 906. The components of the CN 924 may be implemented in one physical device or separate physical devices including components to read and execute instructions from a machine-readable or computer-readable medium (e.g., a non-transitory machine-readable storage medium).

In embodiments, the CN 924 may be an EPC, and the RAN 906 may be connected with the CN 924 via an S1 interface 928. In embodiments, the S1 interface 928 may be split into two parts, an S1 user plane (S1-U) interface, which carries traffic data between the base station 912 or base station 914 and a serving gateway (S-GW), and the S1-MME interface, which is a signaling interface between the base station 912 or base station 914 and mobility management entities (MMEs).

In embodiments, the CN 924 may be a 5GC, and the RAN 906 may be connected with the CN 924 via an NG interface 928. In embodiments, the NG interface 928 may be split into two parts, an NG user plane (NG-U) interface, which carries traffic data between the base station 912 or base station 914 and a user plane function (UPF), and the S1 control plane (NG-C) interface, which is a signaling interface between the base station 912 or base station 914 and access and mobility management functions (AMFs).

Generally, an application server 930 may be an element offering applications that use internet protocol (IP) bearer resources with the CN 924 (e.g., packet switched data services). The application server 930 can also be configured to support one or more communication services (e.g., VoIP sessions, group communication sessions, etc.) for the UE 902 and UE 904 via the CN 924. The application server 930 may communicate with the CN 924 through an IP communications interface 932.

Figure 10:
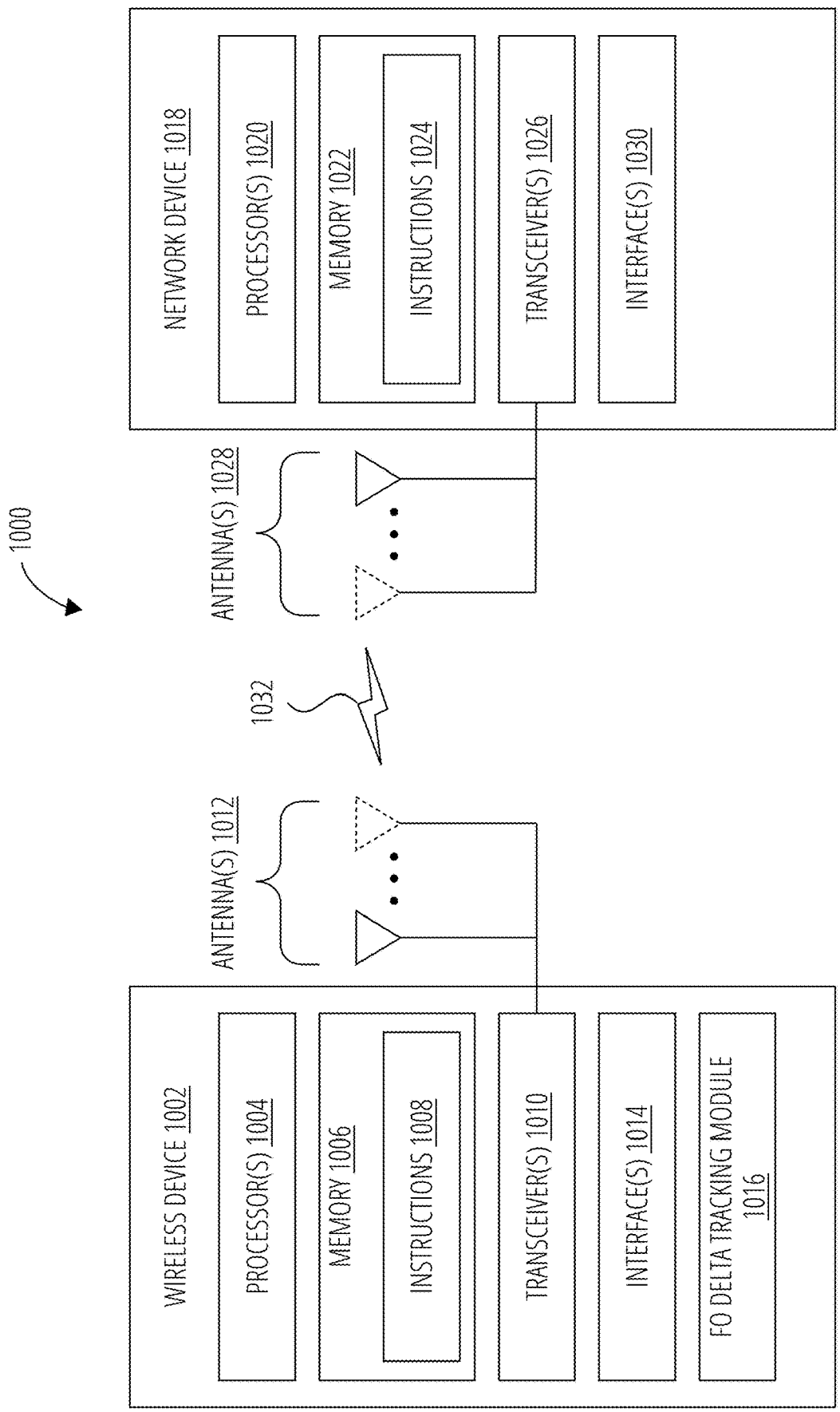
FIG. 10 illustrates a system for performing signaling between a wireless device and a network device, according to embodiments disclosed herein.

FIG. 10 illustrates a system 1000 for performing signaling 1032 between a wireless device 1002 and a network device 1018, according to embodiments disclosed herein. The system 1000 may be a portion of a wireless communications system as herein described. The wireless device 1002 may be, for example, a UE of a wireless communication system. The network device 1018 may be, for example, a base station (e.g., an eNB or a gNB) of a wireless communication system.

The wireless device 1002 may include one or more processor(s) 1004. The processor(s) 1004 may execute instructions such that various operations of the wireless device 1002 are performed, as described herein. The processor(s) 1004 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 1002 may include a memory 1006. The memory 1006 may be a non-transitory computer-readable storage medium that stores instructions 1008 (which may include, for example, the instructions being executed by the processor(s) 1004). The instructions 1008 may also be referred to as program code or a computer program. The memory 1006 may also store data used by, and results computed by, the processor(s) 1004.

The wireless device 1002 may include one or more transceiver(s) 1010 that may include radio frequency (RF) transmitter and/or receiver circuitry that use the antenna(s) 1012 of the wireless device 1002 to facilitate signaling (e.g., the signaling 1032) to and/or from the wireless device 1002 with other devices (e.g., the network device 1018) according to corresponding RATs.

The wireless device 1002 may include one or more antenna(s) 1012 (e.g., one, two, four, or more). For embodiments with multiple antenna(s) 1012, the wireless device 1002 may leverage the spatial diversity of such multiple antenna(s) 1012 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 1002 may be accomplished according to precoding (or digital beamforming) that is applied at the wireless device 1002 that multiplexes the data streams across the antenna(s) 1012 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 1002 may implement analog beamforming techniques, whereby phases of the signals sent by the antenna(s) 1012 are relatively adjusted such that the (joint) transmission of the antenna(s) 1012 can be directed (this is sometimes referred to as beam steering).

The wireless device 1002 may include one or more interface(s) 1014. The interface(s) 1014 may be used to provide input to or output from the wireless device 1002. For example, a wireless device 1002 that is a UE may include interface(s) 1014 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 1010/antenna(s) 1012 already described) that allow for communication between the UE and other devices and may operate according to known protocols (e.g., Wi-Fi®, Bluetooth®, and the like).

The wireless device 1002 may include an FO delta tracking module 1016. The FO delta tracking module 1016 may be implemented via hardware, software, or combinations thereof. For example, the FO delta tracking module 1016 may be implemented as a processor, circuit, and/or instructions 1008 stored in the memory 1006 and executed by the processor(s) 1004. In some examples, the FO delta tracking module 1016 may be integrated within the processor(s) 1004 and/or the transceiver(s) 1010. For example, the FO delta tracking module 1016 may be implemented by a combination of software components (e.g., executed by a DSP or a general processor) and hardware components (e.g., logic gates and circuitry) within the processor(s) 1004 or the transceiver(s) 1010.

The FO delta tracking module 1016 may be used for various aspects of the present disclosure, for example, aspects of FIG. 3, FIG. 4, FIG. 5, FIG. 6, FIG. 7, and/or FIG. 8.

The network device 1018 may include one or more processor(s) 1020. The processor(s) 1020 may execute instructions such that various operations of the network device 1018 are performed, as described herein. The processor(s) 1020 may include one or more baseband processors implemented using, for example, a CPU, a DSP, an ASIC, a controller, an FPGA device, another hardware device, a firmware device, or any combination thereof configured to perform the operations described herein.

The network device 1018 may include a memory 1022. The memory 1022 may be a non-transitory computer-readable storage medium that stores instructions 1024 (which may include, for example, the instructions being executed by the processor(s) 1020). The instructions 1024 may also be referred to as program code or a computer program. The memory 1022 may also store data used by, and results computed by, the processor(s) 1020.

The network device 1018 may include one or more transceiver(s) 1026 that may include RF transmitter and/or receiver circuitry that use the antenna(s) 1028 of the network device 1018 to facilitate signaling (e.g., the signaling 1032) to and/or from the network device 1018 with other devices (e.g., the wireless device 1002) according to corresponding RATs.

The network device 1018 may include one or more antenna(s) 1028 (e.g., one, two, four, or more). In embodiments having multiple antenna(s) 1028, the network device 1018 may perform MIMO, digital beamforming, analog beamforming, beam steering, etc., as has been described.

The network device 1018 may include one or more interface(s) 1030. The interface(s) 1030 may be used to provide input to or output from the network device 1018. For example, a network device 1018 that is a base station may include interface(s) 1030 made up of transmitters, receivers, and other circuitry (e.g., other than the transceiver(s) 1026/antenna(s) 1028 already described) that enables the base station to communicate with other equipment in a core network, and/or that enables the base station to communicate with external networks, computers, databases, and the like for purposes of operations, administration, and maintenance of the base station or other equipment operably connected thereto.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) to perform frequency offset (FO) delta tracking between an anchor component carrier (CC) and a non-anchor CC for connected mode discontinuous reception (DRX) carrier aggregation (CA), the method comprising:
for the anchor CC, waking up to perform tracking updates on a plurality of successive DRX cycles;
for the non-anchor CC:
  determining a minimum update interval $\Delta t_{upd}$;
  scheduling wake-ups on a first subset of the plurality of successive DRX cycles based on the minimum update interval $\Delta t_{upd}$;
  for the first subset of the plurality of successive DRX cycles with scheduled wake-ups, performing the tracking updates and updating an FO delta between the anchor CC and the non-anchor CC; and
  for a second subset of the plurality of successive DRX cycles without the scheduled wake-ups, applying the FO delta to correct for a frequency error on the non-anchor CC.

2. The method of claim 1, wherein waking up to perform tracking updates on the anchor CC comprises:
receiving a tracking reference signal (TRS) or a synchronization signal block (SSB) on the anchor CC; and
determining FO information on the anchor CC based at least in part on the TRS or the SSB.

3. The method of claim 2, wherein applying the FO delta comprises using the FO information determined for the anchor CC on the non-anchor CC.

4. The method of claim 1, wherein scheduling the wake-ups for the non-anchor CC comprises, before entering a non-Active Time (NAT):
determining the minimum update interval $\Delta t_{upd}$ based on one or more of a minimum FO update interval $\Delta t_{upd,FO}$, a minimum timing offset (TO) update interval $\Delta t_{upd,TO}$, a minimum power delay profile (PDP) update interval $\Delta t_{upd,PDP}$, and a minimum Doppler shift update interval $\Delta t_{upd,Doppler}$;
in response to the minimum update interval $\Delta t_{upd}$ being greater than a DRX cycle duration $\Delta t_{DrxCycle}$, calculating a time duration $\Delta t_{oppNextButOne}$ from a last performed tracking reference signal (TRS) reception to a possible TRS reception in a next but one NAT;
when the $\Delta t_{oppNextButOne}$ is greater than the minimum update interval $\Delta t_{upd}$, scheduling an update of the FO delta based on a TRS in the NAT; and
when the $\Delta t_{oppNextButOne}$ is less than the minimum update interval $\Delta t_{upd}$, skipping reception of the TRS in the NAT.

5. The method of claim 4, wherein $\Delta t_{upd}=\min(\Delta t_{upd,FO}, \Delta t_{upd,TO}, \Delta t_{upd,PDP}, \Delta t_{upd,Doppler})$.

6. The method of claim 4, wherein the minimum PDP update interval $\Delta t_{upd,PDP} \leq (1/S \times c/v)$, where v is a UE velocity, S is a sampling rate, and c is the speed of light.

7. The method of claim 4, wherein the minimum FO update interval $\Delta t_{upd,FO}$ depends on one or more of a Doppler shift, a UE oscillator frequency drift, and a base station oscillator frequency drift.

8. The method of claim 4, wherein the minimum Doppler shift update interval $\Delta t_{upd,Doppler}$ is based on simulations to determine expected Doppler shift changes and resulting update intervals for different UE velocities and carrier frequencies.

9. The method of claim 4, wherein the minimum TO update interval $\Delta t_{upd,TO}$ is based one or more of a UE velocity, a temperature gradient, an oscillator drift model, a subcarrier spacing, a TRS TO capture range, and a demodulation performance requirement with respect to TO drift.

10. A user equipment (UE), comprising:
a memory to store a value for a minimum update interval $\Delta t_{upd}$; and
a processor configured to:
  for an anchor component carrier (CC), wake up to perform tracking updates on a plurality of successive DRX cycles;
  for a non-anchor CC for connected mode discontinuous reception (DRX) carrier aggregation (CA):
    determine the minimum update interval $\Delta t_{upd}$;
    schedule wake-ups on a first subset of the plurality of successive DRX cycles based on the minimum update interval $\Delta t_{upd}$;
    for the first subset of the plurality of successive DRX cycles with scheduled wake-ups, perform the tracking updates and update an FO delta between the anchor CC and the non-anchor CC; and
    for a second subset of the plurality of successive DRX cycles without the scheduled wake-ups, apply the FO delta to correct for a frequency error on the non-anchor CC.

11. The UE of claim 10, wherein to wake up to perform track updates on the anchor CC, the processor is further configured to:
receive a tracking reference signal (TRS) or a synchronization signal block (SSB) on the anchor CC; and
determine FO information on the anchor CC based at least in part on the TRS or the SSB.

12. The UE of claim 11, wherein to apply the FO delta, the processor is further configured to use the FO information determined for the anchor CC on the non-anchor CC.

13. The UE of claim 10, wherein to schedule the wake-ups for the non-anchor CC, the processor is further configured to, before entering a non-Active Time (NAT):
determine the minimum update interval $\Delta t_{upd}$ based on one or more of a minimum FO update interval $\Delta t_{upd,FO}$, a minimum timing offset (TO) update interval $\Delta t_{upd,TO}$, a minimum power delay profile (PDP) update interval $\Delta t_{upd,PDP}$, and a minimum Doppler shift update interval $\Delta t_{upd,Doppler}$;

in response to the minimum update interval $\Delta t_{upd}$ being greater than a DRX cycle duration $\Delta t_{DrxCycle}$, calculate a time duration $\Delta t_{oppNextButOne}$ from a last performed tracking reference signal (TRS) reception to a possible TRS reception in a next but one NAT;

when the $\Delta t_{oppNextButOne}$ is greater than the minimum update interval $\Delta t_{upd}$, schedule an update of the FO delta based on a TRS in the NAT; and when the $\Delta t_{oppNextButOne}$ is less than the minimum update interval $\Delta t_{upd}$, skip reception of the TRS in the NAT.

14. The UE of claim 13, wherein $\Delta t_{upd} = \min(\Delta t_{upd,FO}, \Delta t_{upd,TO}, \Delta t_{upd,PDP}, \Delta t_{upd,Doppler})$.

15. The UE of claim 13, wherein the minimum PDP update interval $\Delta t_{upd,PDP} \leq (1/S \times c/v)$, where v is a UE velocity, S is a sampling rate, and c is the speed of light.

16. The UE of claim 13, wherein the minimum FO update interval $\Delta t_{upd,FO}$ depends on one or more of a Doppler shift, a UE oscillator frequency drift, and a base station oscillator frequency drift.

17. The UE of claim 13, wherein the minimum Doppler shift update interval $\Delta t_{upd,Doppler}$ is based on simulations to determine expected Doppler shift changes and resulting update intervals for different UE velocities and carrier frequencies.

18. The UE of claim 13, wherein the minimum TO update interval $\Delta t_{upd,TO}$ is based one or more of a UE velocity, a temperature gradient, an oscillator drift model, a subcarrier space, a TRS TO capture range, and a demodulation performance requirement with respect to TO drift.

19. A non-transitory computer-readable storage medium, the computer-readable storage medium including instructions that when executed by a processor of a user equipment (UE), cause the processor to:

for an anchor component carrier (CC), wake up to perform tracking updates on a plurality of successive DRX cycles;

for a non-anchor CC:
determine a minimum update interval $\Delta t_{upd}$;
schedule wake-ups on a first subset of the plurality of successive DRX cycles based on the minimum update interval $\Delta t_{upd}$;
for the first subset of the plurality of successive DRX cycles with scheduled wake-ups, perform the tracking updates and updating an FO delta between the anchor CC and the non-anchor CC; and
for a second subset of the plurality of successive DRX cycles without the scheduled wake-ups, apply the FO delta to correct for a frequency error on the non-anchor CC.

20. The computer-readable storage medium of claim 19, wherein to schedule the wake-ups for the non-anchor CC, the instructions are further to cause the processor to, before entering a non-Active Time (NAT):

determine the minimum update interval $\Delta t_{upd}$ based on one or more of a minimum FO update interval $\Delta t_{upd,FO}$, a minimum timing offset (TO) update interval $\Delta t_{upd,TO}$, a minimum power delay profile (PDP) update interval $\Delta t_{upd,PDP}$, and a minimum Doppler shift update interval $\Delta t_{upd,Doppler}$;

in response to the minimum update interval $\Delta t_{upd}$ being greater than a DRX cycle duration $\Delta t_{DrxCycle}$, calculate a time duration $\Delta t_{oppNextButOne}$ from a last performed tracking reference signal (TRS) reception to a possible TRS reception in a next but one NAT;

when the $\Delta t_{oppNextButOne}$ is greater than the minimum update interval $\Delta t_{upd}$, schedule an update of the FO delta based on a TRS in the NAT; and when the $\Delta t_{oppNextButOne}$ is less than the minimum update interval $\Delta t_{upd}$, skip reception of the TRS in the NAT.

* * * * *